United States Patent
Furge

(10) Patent No.: US 10,480,319 B2
(45) Date of Patent: Nov. 19, 2019

(54) AUTOMATED DEVICE FOR DRILLING A HOLE IN THE VAULT AND WALLS OF A TUNNEL AND FOR INSTALLING AN ANCHORING ELEMENT INTO SAID HOLE

(71) Applicant: BOUYGUES TRAVAUX PUBLICS, Guyancourt (FR)

(72) Inventor: Jerome Furge, Versailles (FR)

(73) Assignee: BOUYGUES TRAVAUX PUBLICS, Guyancourt (FR)

( * ) Notice: Subject to any disclaimer, the term of this patent is extended or adjusted under 35 U.S.C. 154(b) by 0 days.

(21) Appl. No.: 15/712,493

(22) Filed: Sep. 22, 2017

(65) Prior Publication Data
US 2018/0080322 A1    Mar. 22, 2018

(30) Foreign Application Priority Data
Sep. 22, 2016   (FR) ...................................... 16 58903

(51) Int. Cl.
*E21B 19/087*    (2006.01)
*E21D 20/00*     (2006.01)
(Continued)

(52) U.S. Cl.
CPC .............. *E21D 20/003* (2013.01); *B25J 5/06* (2013.01); *B25J 11/00* (2013.01); *B25J 15/0066* (2013.01);
(Continued)

(58) Field of Classification Search
CPC . E21B 7/022; E21B 7/025; E21D 9/13; E21D 20/003
See application file for complete search history.

(56) References Cited

U.S. PATENT DOCUMENTS

| | | | | |
|---|---|---|---|---|
| 3,529,680 A | * | 9/1970 | Jaeggi ..................... | E21B 7/024 173/189 |
| 4,113,033 A | * | 9/1978 | Lindblad ................. | E21B 7/022 173/1 |

(Continued)

FOREIGN PATENT DOCUMENTS

| | | |
|---|---|---|
| CN | 201714390 | 1/2011 |
| DE | 3328582 | 3/1984 |

(Continued)

OTHER PUBLICATIONS

Bartley, Darrell; TBM Guidance & Surveying tools case study; Jun. 22, 2015 (Year: 2015).*

(Continued)

*Primary Examiner* — Benjamin F Fiorello
(74) *Attorney, Agent, or Firm* — Womble Bond Dickinson (US) LLP

(57) ABSTRACT

The invention relates to an automated device for drilling a hole in the vault and walls of a tunnel and for installing an anchoring element in said hole, characterized in that it comprises:
   a robot (5) comprising a base (50), a robotic arm (51) extending from the base and a multifunctional head (52) arranged at the end of the arm and movable over 360 degrees, said multifunctional head comprising a drilling means (520), a percussion means (521) suitable for inserting an anchoring element in the hole, and a vision system (522),
   an elevating platform (1) bearing a device (2) for guiding in translation the base of the robot,
   a control unit suitable for communicating with a controller of the robot and comprising a processor configured
(Continued)

to determine in real time the position of the robot in a three-dimensional reference frame of the tunnel and a man-machine interface.

13 Claims, 4 Drawing Sheets

(51) Int. Cl.
| | | |
|---|---|---|
| *E21B 7/02* | (2006.01) | |
| *E21D 9/13* | (2006.01) | |
| *B28D 1/14* | (2006.01) | |
| *E21F 17/02* | (2006.01) | |
| *B25J 5/06* | (2006.01) | |
| *B25J 11/00* | (2006.01) | |
| *B25J 15/00* | (2006.01) | |
| *B25H 1/00* | (2006.01) | |
| *B25J 18/04* | (2006.01) | |

(52) U.S. Cl.
CPC ............... *B28D 1/14* (2013.01); *E21B 7/022* (2013.01); *E21B 7/025* (2013.01); *E21B 19/087* (2013.01); *E21D 9/13* (2013.01); *E21F 17/02* (2013.01); *B25H 1/0035* (2013.01); *B25J 18/04* (2013.01); *B28D 1/146* (2013.01)

(56) References Cited

U.S. PATENT DOCUMENTS

| | | | | |
|---|---|---|---|---|
| 4,226,559 A | * | 10/1980 | Prebensen | E21B 7/025 173/184 |
| 4,645,084 A | * | 2/1987 | Deike | B25J 9/046 173/194 |
| 4,890,680 A | * | 1/1990 | Porsfeld | B28D 1/14 173/185 |
| 7,681,660 B2 | * | 3/2010 | Muona | E21B 7/022 173/1 |
| 7,874,379 B2 | * | 1/2011 | Saf | E21B 7/025 173/176 |
| 9,957,797 B2 | * | 5/2018 | Pettersson | E21D 20/003 |
| 2003/0066665 A1 | * | 4/2003 | Coombs | E21D 20/006 173/32 |
| 2014/0110139 A1 | * | 4/2014 | Pursimo | E21B 7/022 173/1 |
| 2014/0313502 A1 | * | 10/2014 | Steele | E21C 35/00 356/4.01 |
| 2017/0138192 A1 | * | 5/2017 | Wang | G05D 1/0088 |
| 2017/0275947 A1 | * | 9/2017 | Morissette | E21B 7/025 |

FOREIGN PATENT DOCUMENTS

| | | |
|---|---|---|
| FR | 2958573 | 10/2011 |
| SE | 539411 C2 * | 1/2016 |
| WO | WO-2008010757 | 1/2008 |
| WO | WO-2009136841 | 11/2009 |

OTHER PUBLICATIONS

Berlin, R., "Development of a multi-purpose mobile robot for concrete surface processing", Automation and Robotics in Construction XI, D.A. Chamberlain (Editor), 1994, 133-140.

Bouygues Travaux Publics, "French Preliminary Search Report," FR Application No. 1658903 (dated May 10, 2017) (with French translation cover sheet).

* cited by examiner

AUTOMATED DEVICE FOR DRILLING A HOLE IN THE VAULT AND WALLS OF A TUNNEL AND FOR INSTALLING AN ANCHORING ELEMENT INTO SAID HOLE

FIELD OF THE INVENTION

The present invention relates to an automated device for drilling a hole in the vault and walls of a tunnel and for installing an anchoring element into said hole.

BACKGROUND OF THE INVENTION

During the construction of a tunnel it is necessary to attach objects, such as cables, pipes, lighting, traffic signs, etc. to the vault of the tunnel, the surface whereof is generally made of concrete.

A tunnel several kilometers in length can thus require the drilling of several tens of thousands of holes in the vault and walls.

To this end, it is necessary to drill a hole in the vault or wall of the tunnel, and then to insert into it an anchoring element, such as a dowel, allowing the attachment of the object.

At the present time, these operations are carried out by an operator.

Considering the height of the vault (several meters), it is necessary to install a scaffolding so that the operator can be in a suitable position with respect to the intended location. The placement of the hole is marked manually, using chalk for example, then the hole is drilled by the operator by means of a drill. Then, the anchoring element is inserted into the hole.

This intervention by an operator proves unsatisfactory for various reasons.

On the one hand, the drilling of each hole and the installation of each respective anchoring element require considerable time.

On the other hand, the operator is exposed to conditions harmful to his health, such as an atmosphere loaded with dust, a noisy environment, without counting the risks associated with working at a height.

A need has therefore appeared to automate these operations so as to minimize the intervention of an operator.

Attempts at automating the drilling of holes in tunnels have already been described for different applications.

The article entitled "The development and testing of a mobile drilling robot" [1] describes a robot mounted on wheels designed to drill holes in the floor of a tunnel designed to be equipped with a railway. The robot comprises two perforators allowing two holes to be drilled simultaneously, as well as means for controlling the position in two directions (in a horizontal plane formed by the ground) and the orientation of the perforators and a position sensor with rotating lasers using reference reflectors. Based on the coordinates of the holes to be drilled and of the reflectors, the robot is capable of carrying out precision drilling at a high rate.

However, drilling holes into the vault of a tunnel has a greater complexity than into the ground, and imposes in particular controlling the position and orientation of the robot in the three spatial directions. On the other hand, document [1] does not address the problem of automated installation of anchoring elements in the holes.

Document CN 201714390 [2], for its part, describes a robot designed to excavate rocks for the purpose of drilling a tunnel. This robot is designed to cut holes into rocks so as to then place there a stick of explosive to make the rock explode. This document does not address the problem of precise positioning of the hole in the vault of a tunnel already constructed, nor that of installing anchoring elements.

BRIEF DESCRIPTION OF THE INVENTION

One goal of the invention is to design an automated device allowing drilling a hole in the vault or a wall of a tunnel, then inserting an anchoring element into said hole.

In accordance with the invention, an automated device is proposed for drilling a hole in the vault and walls of a tunnel and installing an anchoring element into said hole, characterized in that it comprises:
- a robot comprising a base, a robotic arm extending from the base and a multifunctional head arranged at the end of the arm and movable over 360 degrees, said multifunctional head comprising a drilling means, a percussion means suitable for inserting an anchoring element into the hole, and a vision system,
- an elevating platform bearing a device for guiding in translation the base of the robot,
- a control unit suitable for communicating with a controller of the robot and comprising a processor configured to determine in real time the position of the robot in a three-dimensional reference frame of the tunnel and a man-machine interface.

This device has the following advantages.

On the one hand, in terms of safety, the device reduces the risk of falls because the presence of an operator at a height is minimized. Only possible zones inaccessible to the robotic arm require an intervention by an operator.

On the other hand, this device avoids exposing an operator to dust or noise conditions which would be harmful to his health.

The robot also provides an improvement in the accuracy and repeatability of hole drilling.

Finally, the device provides considerable progress in terms of productivity, the device being capable of operating for several hours at a high rate.

According to other aspects of the invention:
- the robot comprises a sensor capable of detecting a contact between the end of a tool mounted on the drilling means and the wall of the tunnel;
- the control unit is configured to receive a program for hole drilling and anchoring element installation into said holes and the controller of the robot is configured to bring the multifunctional head facing the position planned for each hole;
- the man-machine interface is configured to allow an operator to modify the position and/or the drilling direction of a hole planned in said program;
- the control unit is configured to record data regarding drilled holes and/or anchoring elements installed by the robot;
- the control unit is configured to determine an optimal height of the platform;
- the platform is provided with at least three prisms arranged so as to be able to be detected by a theodolite present in the tunnel;
- the multifunction head comprises a means for aspirating dust generated during the drilling of each hole.

Another object relates to an automated method for drilling a hole in the vault and walls of a tunnel and installing an anchoring element into said hole, characterized in that it comprises:

supplying of a device as described above,
installing the platform in a first position,
determining said first position with respect to a three-dimensional reference frame of the tunnel,
determining the position of the robot in said reference frame,
installing the multifunctional head of the robot facing a first hole to be drilled, the position whereof is known in said reference frame,
drilling said first hole,
installing an anchoring element into said first hole.

BRIEF DESCRIPTION OF THE DRAWINGS

Other characteristics and advantages of the invention will be revealed by the description that follows, with reference to the appended drawings wherein.

Elements identified by the same reference symbol from one figure to another are identical, or at least perform the same function.

DETAILED DESCRIPTION OF THE INVENTION

Generally, the device according to the invention comprises a robot having a base, a robotic arm articulated with six degrees of freedom extending from the base, and a multifunctional head arranged at the end of the arm and movable over 360 degrees. The base is mounted on a device for guiding in translation, itself attached to an elevating platform the height whereof is adjustable to allow the multifunctional head to reach the desired position on the vault or the walls of the tunnel.

Figure 1A:
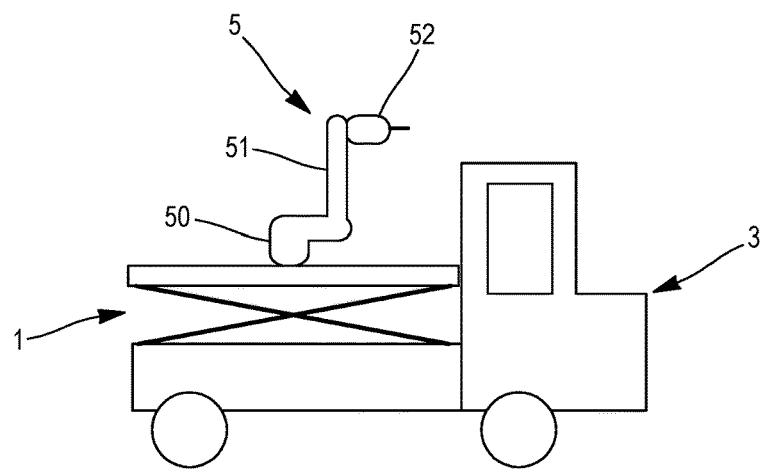
FIG. 1A-1C illustrate an overview of the device according to one embodiment of the invention, carried on a suitable truck for moving the device inside the tunnel.
Figure 1B:
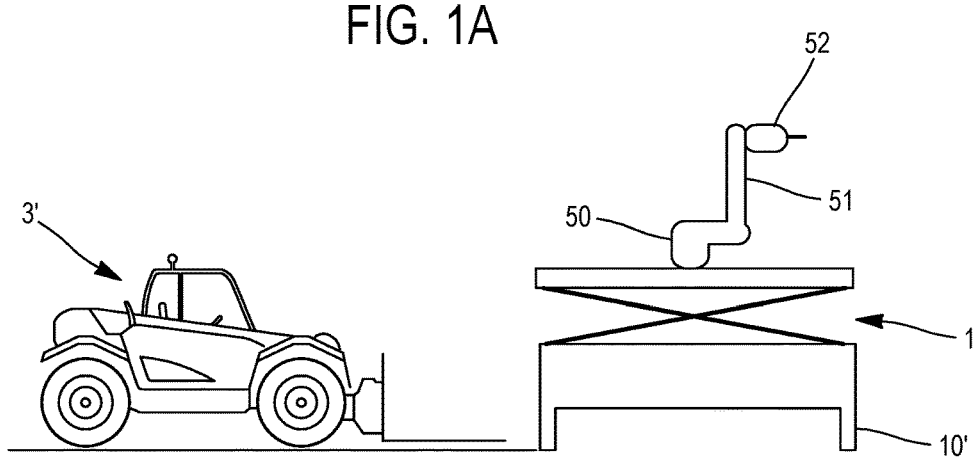
Figure 1C:
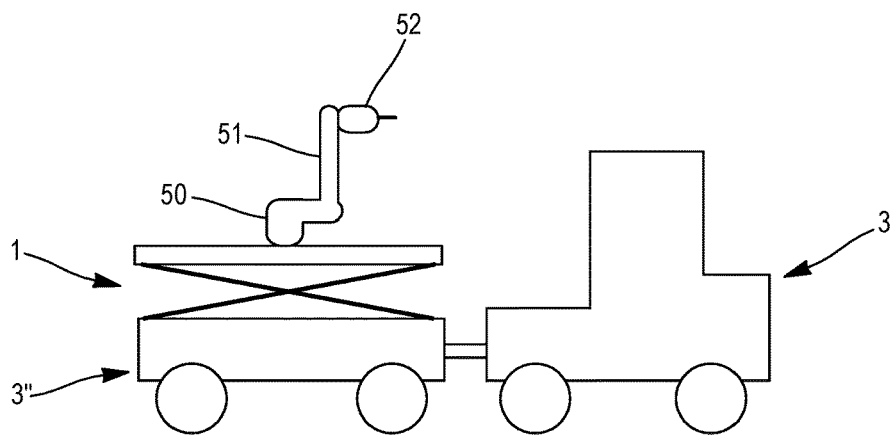

FIGS. 1A to 1C illustrate different non-limiting modalities of transportation of the device inside the tunnel.

With reference to FIG. 1A, the platform 1 is carried on the bed of a truck. The robot is designated by the symbol 3, the device for guiding in translation not being shown in FIGS. 1A to 1C. The truck is provided with stabilizers (not shown) ensuring the stability of the device when the robot is operating.

In the embodiment illustrated in FIG. 1B, the platform 1 is autonomous, that is it is provided with legs 10' on which it can be emplaced in a stable manner on the ground. It can be moved by means of a forklift 3'.

With reference to FIG. 1C, the platform 1 is carried on the trailer 3" of a truck 3, said trailer being provided with stabilizers (not shown).

No matter what means of transport is used, this is a standard means usually employed on a construction site, which can be used without requiring a specific adaptation for the implementation of the invention.

Figure 2:
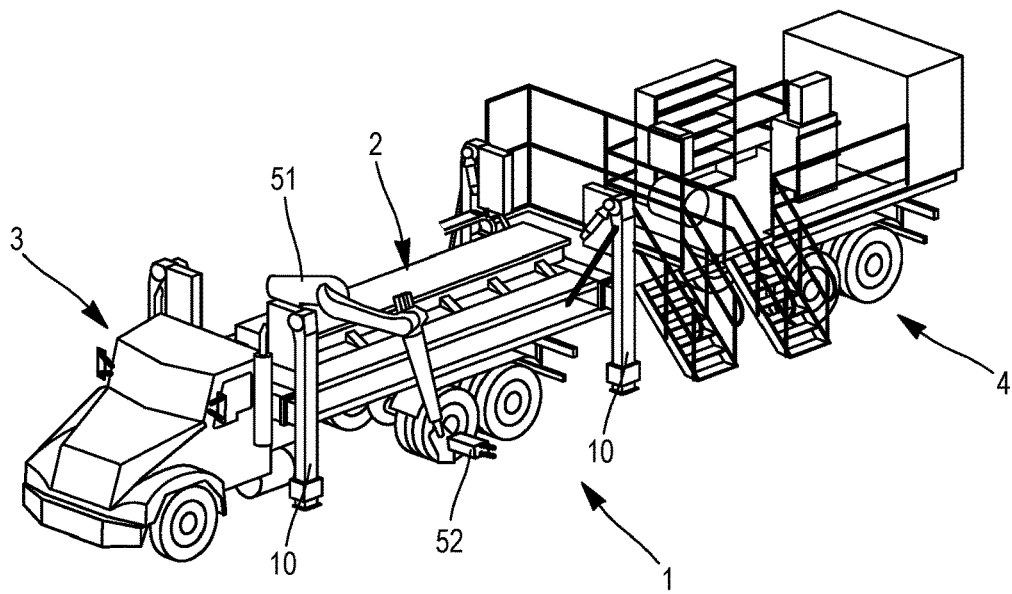
FIG. 2 is an overview of the device of FIG. 1, in an operating configuration.

FIG. 2 presents an overall view of the drilling device according to an embodiment wherein the platform is carried on the trailer or the bed of a truck.

The platform 1 extends in a horizontal plane, that is parallel to the floor of the tunnel.

The platform 1 is equipped with four telescoping lifting legs 10 which, as will be seen below, allow stabilizers to be dispensed with for the trailer. Alternatively, and as shown schematically in FIG. 1C, the platform could consist of a scissors lift.

The platform 1 has a generally parallelepiped shape, the legs 10 being positioned on the two long sides, preferably in the vicinity of the corners to ensure maximum stability.

The device also comprises a device 2 for guiding the robotic arm 51 in translation, which is arranged on the platform 1. Advantageously, the direction of translation is parallel 35 to the two long sides of the platform, so as to offer the greatest possible range of displacement of the robot. Said range is typically on the order of the length of the platform, which is generally on the order of several meters.

For the setting up of the device in the tunnel, the platform is carried on the trailer or the bed of a truck, the legs 10 not touching the ground. The truck therefore allows the platform to be moved in the tunnel to position it at a position from which a series of holes must be drilled in the vault or the walls. By successively displacing the truck by a distance on the order of the length of the platform, the set of holes planned for in the vault and the walls of the tunnel can thus be drilled incrementally.

Advantageously, the width of the platform and of the truck is less than or equal to half the width of the tunnel, so as to allow the drilling of holes over half the vault, the platform occupying at most half of the heading, while allowing the passage of construction and/or personnel vehicles on the other half of the heading. In the case of a narrower tunnel (one traffic lane), the robot could carry out drilling on the entire vault but the passage of construction vehicles would no longer be possible.

During the operation of the device, once the platform has been positioned at the desired location, the four legs are deployed so as to rest on the ground in a stable manner.

Moreover, the deployment of telescoping feet 10 allows the platform to be raised to a suitable height to allow the device to reach the vault V to drill the planned holes therein.

Advantageously, the truck pulls, behind the trailer or the bed which supports the platform 1, a second trailer 4 which carries a generator suitable for supplying the robot with energy, as well as a control unit configured to control the displacements of the robot with respect to the platform by communicating with a controller of the robot. Naturally, this form of execution is not limiting and the generator and the control unit could be situated at other locations.

Figure 3:
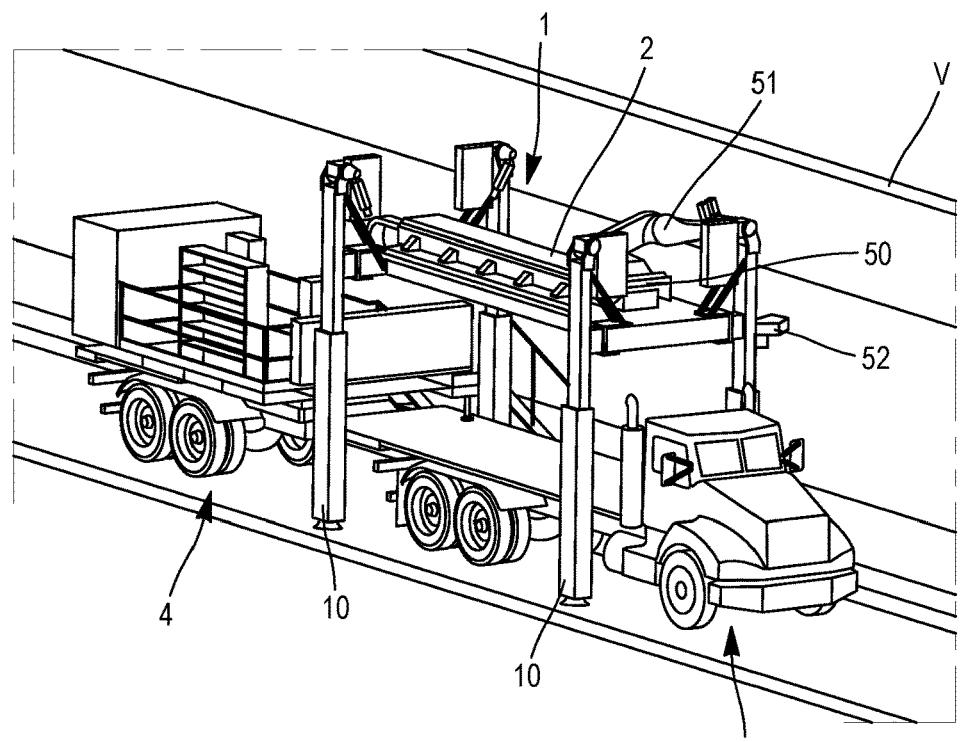
FIGS. 3 and 4 are perspective views of the device of FIG. 2, from other points of view.
Figure 4:
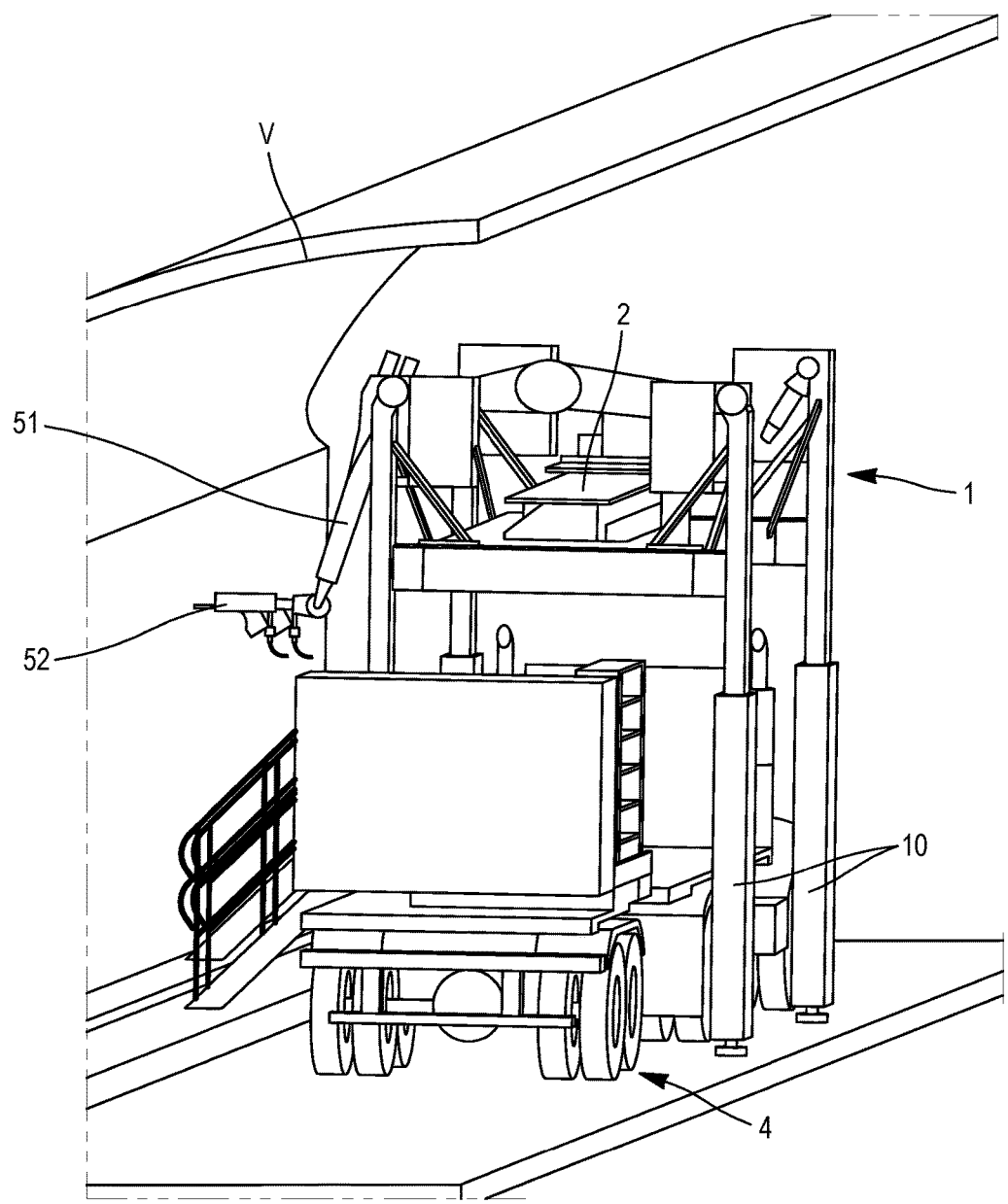

FIGS. 3 and 4 show perspective views of the device of FIG. 2 in other operating configurations.

Figure 5:
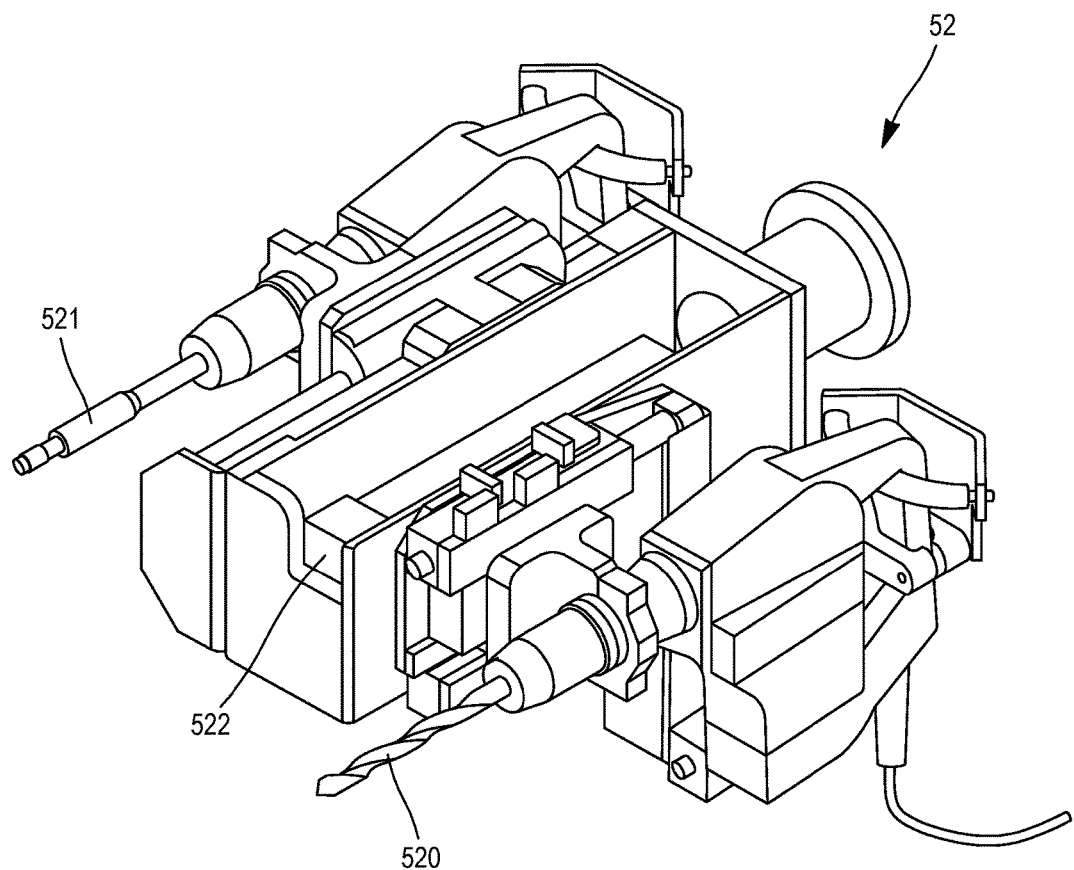
FIG. 5 is a perspective view of a multifunctional head arranged at the end of the robotic arm.

FIG. 5 illustrates one embodiment of the multifunctional head 52.

Said multifunctional head 52 comprises a drilling means 520 and a means 521 for inserting an anchoring element such as a dowel.

The drilling means is suitable for driving a drill bit in rotation, said drill bit having features suitable to the material of the vault to be drilled. The drilling means is configured to adapt itself to different tools, selected depending on the diameter of the hole to be drilled or according to the nature of the tunnel casing.

The insertion means comprises a magazine for storing anchoring elements, a point on which the anchoring means can be threaded, and a percussion system allowing the anchoring element to be driven in once it has been placed facing the hole.

In a particularly advantageous manner, the device also comprises a means (not shown) for aspirating dust generated during drilling, which contributes to sanitizing the ambient atmosphere.

The device also comprises a means for blowing compressed air into the drilled hole, so as to eliminate possible residues which would prevent proper insertion of the anchoring element. Advantageously, the aspiration means is activated during the operation of the blowing means.

Preferably, the multifunctional head is arranged pivotally with respect to the end of the robotic arm, the drilling means and the insertion means being arranged at the same distance from the pivoting axis as the head, so that the robotic arm can be held immobile during the entire drilling, aspiration and insertion of the anchoring element sequence, only the head pivoting to successively bring the necessary means facing the hole.

In a particularly advantageous manner, the head also comprises a vision means 522, for example a rangefinder, configured to detect the presence of obstacles preventing the drilling of the hole, or of seals which must not be drilled.

Moreover, the robot is advantageously equipped with at least one sensor capable of detecting a contact between the end of the drilling tool and the wall of the tunnel. This makes it possible to control the placement and the depth of the drilled hole, and possibly to monitor the force applied to the tool during drilling.

The control unit of the device comprises a processor configured to determine, in real time, the position of the robot in a three-dimensional reference frame of the tunnel.

The control unit also comprises a man-machine interface.

Said control unit can be carried on the platform, on the second trailer of the truck, or at any other appropriate location.

To allow the localization of the device, a theodolite is used which is a device customarily used in tunnel construction sites to measure the distances between the theodolite, which comprises a laser, and objects bearing a prism. During a sighting of the prism by the laser, the prism separates the incident ray into a deviated ray and a reflected ray parallel to the incident ray. In a manner known per se, the comparison of the incident ray and the reflected ray allow the coordinates of the center of the prism to be determined.

To implement such a localization, the platform is provided with at least three prisms (or any other means allowing the incident ray to be reflected toward the theodolite), each arranged at a known position of the platform.

The theodolite, which does not form a part of the present invention, is fixed in the tunnel.

A sighting of the prisms of the platform and of the prisms attached to the wall of the tunnel makes it possible to determine accurately the position of the platform with respect to the tunnel and therefore with respect to the position of the holes to be drilled.

More precisely, in a first step, the theodolite implements a 360° rotation to calculate the position of the different prisms positioned at known locations on the walls of the tunnel, and deduces its own position therefrom. The theodolite being fixed in the tunnel, this determination does not need to be repeated at each new localization of the platform.

The theodolite then sights, along a given angle, the three prisms located on the platform. This measurement allows the coordinates in space of each of the prisms to be determined. From these coordinates, the position and the inclination of the platform with respect to the tunnel are accurately determined. These data are communicated to the process of the control unit by any appropriate means.

The position of the base of the robot is deduced from the position of the platform and from the position of the base with respect to the platform, which is known. For example, at the beginning of each cycle, the device for guiding in translation to which is attached the base of the robot can be in a known reference position with respect to the platform. Moreover, during the operation of the robot, the position of the different actuators allowing the arm to be displaced is also known, so that the position of the multifunctional head can be determined in real time by the processor of the control unit.

The man-machine interface allows a pre-recorded installation program to be changed, or providing specific commands entered by an operator.

The loaded and modifiable data comprise: the type of hole (which includes the diameter, the depth, the drilling direction, the type of anchoring element designed to be inserted in the hole if applicable, the maximum number of holes which can be drilled with the same tool), the position of the hole (which can be defined by the three-dimensional coordinates (x, y, z) or by a longitudinal position of a section of the tunnel and by two coordinates (x, z) in said section), the fact that the hole belongs to a set of holes designed to attach one piece of equipment (a specific trajectory being impossible to guarantee the accuracy of the position of the different holes with respect to one another).

The installation program can be defined by means of a computer-assisted design program (CAD), by means of which the position of each hole, the type of hole and the type of anchoring element to be installed, if applicable, in said hole are indicated on a three-dimensional model of the wall of the tunnel.

Advantageously, the entry of specific commands can be accomplished by means of spreadsheet type software.

For example, the operator can select, from the man-machine interface, the type of hole to be drilled by activating or de-activating each of the different types of holes configured. The operator can also exclude certain holes from the program to be executed.

Moreover, the robot can progressively record, during execution, the information on each hole drilled and on each anchoring element installed. This information can then be displayed on the man-machine interface and an execution report can be recorded in a memory of the control unit, sent to a distant unit or printed.

On the other hand, the robot can have different modes of operation.

In an automatic mode, the robot drills the all the programmed holes and installs all the planned anchoring elements, without intervention by the operator.

In a semi-automatic mode, the robot positions the tool in contact with the wall of the tunnel at the location planned for the hole, and waits for confirmation from the operator to proceed with drilling. If necessary, the operator can adjust the position and/or the drilling direction by means of the man-machine interface.

Finally, in a test mode, the robot positions the tool in contact with the wall of the tunnel at the location planned for a hole, and waits for a confirmation of the operator as in the semi-automatic mode; however, in this case, it does not drill the hole but positions the tool at the location of the following hole. This allows the operator to operate the drilling program in advance to verify the positions of the holes and/or the trajectory of the robot.

One cycle of operation of the device typically comprises the following steps.

Firstly, the platform is brought to the desired location, by the truck or any other means allowing the platform to be transported. The truck is driven by an operator.

The telescoping legs of the platform are then deployed to be supported in a stable manner on the ground. The actuation of the legs can be controlled by an operator.

If necessary, an operator brings a set of drilling and/or anchoring element insertion tools to the base of the robot. The robot is capable of replacing a tool of the multifunctional head, for example in the case of wear in a tool in place, or to use a tool with a different size or different features.

For reasons of safety, no operator is present on the platform during the operation of the device, unless the platform comprises a safety zone for this purpose.

The platform is then localized in the tunnel, by means of the theodolite and the prisms present on the platform, as indicated previously. The position of the base of the robot is deduced from the position of the platform and from the position of the base with respect to the platform, which is known. For example, at the beginning of each cycle, the device for guiding in translation to which the base of the robot is attached can be in a known reference position with respect to the platform. Moreover, during the operation of the robot, the position of the different actuators allowing the arm to be displaced is also known, so that the position of the multifunctional head can be determined in real time by the control unit.

The vision system is then used to detect the possible presence of zones wherein no drilling must be carried out. The signal recorded by the vision system is transmitted to the control unit, which deduces from it the zones to be avoided by the drilling device.

Then, the device begins the hole drilling and anchoring element installation program.

This program begins with the drilling of a hole, then blowing air into said hole to remove possible residues. Generally, the hole is substantially perpendicular to the wall of the tunnel, even though it is possible to control the drilling of a hole that is inclined with respect to this direction. Finally, the insertion means installs the anchoring element in the hole.

Once an anchoring element has been introduced into a hole, the robotic arm moves so as to position the drilling means facing a new hole to be drilled.

If applicable, the robot proceeds with a tool change if the diameter of the hole differs from the previous one. This change can be carried out without the intervention of an operator, the arm being capable of gaining access to a set of tools previously placed in proximity to its base and to automatically replace the tool with which it is equipped with another.

During the hole drilling and anchoring element installation program, the platform can possibly be raised or lowered. The control unit calculates automatically a suitable platform height depending on the position of the hole to be drilled and to be equipped with an anchoring element.

Each time the platform is moved, a new localization by means of the prisms and of the theodolite is necessary for determining the position of the robot.

Once the set of anchoring elements has been inserted into the holes accessible to the robotic arm, the legs of the platform are retracted to allow the platform to be moved to the subsequent location. During this transportation, the robotic arm is advantageously held rigidly in a rest position to avoid any unintentional movement of the arm and to avoid any damage which would result from it. This movement can be of the order of a few meters. Taking into account the fact that the robotic arm can operate in a zone extending beyond the platform in the longitudinal direction, two successive positions of the platform can be a few meters distant, so as to minimize the number of movements and installations of the platform.

The sequence described above is then repeated, until all the holes have been drilled and equipped with an anchoring element.

Thanks to the robot, accuracy on the order of 20 mm can be expected on the position of the center of a hole with respect to the programmed position, this accuracy possibly being reduced to about 3 mm when the hole is part of a set of holes designed to support the same piece of equipment.

Finally, it goes without saying that the examples which have just been given are only particular illustrations, not limiting in any way as to the fields of application of the invention. In particular, although the invention has been described in connection with the installation of anchoring elements in the vault of a tunnel, it can also be used for other types of work requiring the drilling of holes and the installation of anchoring elements at a high rate, and to positions poorly accessible to operators.

REFERENCES

[1] The development and testing of a mobile drilling robot, Ruud P. W. J. Kloek, Jan Bos, Ruud M. S. v.d. Marck, *Automation and Robotics in Construction* XI, D. A. Chamberlain (Editor), © 1994 Elsevier Science B.V.
[2] CN 201714390

The invention claimed is:

1. An automated device for drilling a hole in the vault and walls of a tunnel and installing an anchoring element into said hole, comprising:
    a robot comprising a base, a robotic arm extending from the base and a multifunctional head arranged at the end of the arm and movable over 360 degrees, said multifunctional head comprising a drill, a percussor operable for inserting an anchoring element in the hole, and a vision system,
    an elevating platform bearing a device for guiding in translation the base of the robot,
    a control unit suitable for communicating with a controller of the robot and with a theodolite present in the tunnel, the control unit comprising a man-machine interface and a processor configured to determine in real time the position of the robot in a three-dimensional reference frame of the tunnel based on localization information of the platform provided by the theodolite,
    wherein the platform is provided with at least three prisms arranged so as to be able to be detected by the theodolite.

2. The device of claim 1, wherein the robot comprises a sensor configured for detecting a contact between the end of a tool mounted on the drill and the wall of the tunnel.

3. The device according to claim 1, wherein the control unit is configured to receive a program for hole drilling and anchoring element installation in said holes and the controller of the robot is configured to bring the multifunctional head facing the position planned for each hole.

4. The device of claim 1, wherein the man-machine interface is configured to allow an operator to modify the position and/or the drilling direction of a hole planned in said program.

5. The device of claim 1, wherein the control unit is configured to record data regarding drilled holes and/or anchoring elements installed by the robot.

6. The device of claim 1, wherein the control unit is configured to determine a predetermined height of the platform depending on a position of the hole to be drilled and equipped with an anchoring element to allow the multifunctional head drilling said hole and equipping said hole with the anchoring element.

7. An automated method for drilling a hole in the vault and the walls of a tunnel and installing an anchoring element into said hole, comprising:
providing a device according to claim 1,
installing the platform in a first position,
determining said first position with respect to a three-dimensional reference frame of the tunnel,
determining the position of the robot in said reference frame,
installing the multifunctional head of the robot facing a first hole to be drilled, the position whereof being known in said reference frame,
drilling said first hole,
installing an anchoring element into said first hole.

8. An automated device for drilling a hole in the vault and walls of a tunnel and installing an anchoring element into said hole, comprising:
a robot comprising a base, a robotic arm extending from the base and a multifunctional head arranged at the end of the arm and movable over 360 degrees, said multifunctional head comprising a drill, a percussor operable for inserting an anchoring element in the hole, and a vision system,
an elevating platform bearing a device for guiding in translation the base of the robot, the platform comprising at least three prisms arranged so as to be able to be detected by a theodolite present in the tunnel, and
a control unit suitable for communicating with a controller of the robot and comprising a processor configured to determine in real time the position of the robot in a three-dimensional reference frame of the tunnel and a man-machine interface.

9. The device of claim 8, wherein the robot comprises a sensor configured for detecting a contact between the end of a tool mounted on the drill and the wall of the tunnel.

10. The device according to claim 8 wherein the control unit is configured to receive a program for hole drilling and anchoring element installation in said holes and the controller of the robot is configured to bring the multifunctional head facing the position planned for each hole.

11. The device of claim 8, wherein the man-machine interface is configured to allow an operator to modify the position and/or the drilling direction of a hole planned in said program.

12. The device of claim 8, wherein the control unit is configured to record data regarding drilled holes and/or anchoring elements installed by the robot.

13. The device of claim 8, wherein the control unit is configured to determine a suitable height of the platform depending on a position of the hole to be drilled and equipped with an anchoring element to allow the multifunctional head drilling said hole and equipping said hole with the anchoring element.

* * * * *